Jan. 31, 1933.  D. L. LOTTS  1,895,888
TRANSMISSION
Filed Jan. 24, 1930  3 Sheets-Sheet 3

Inventor
Delbert L Lotts
by Charles T. Hill Attys.

Patented Jan. 31, 1933

1,895,888

UNITED STATES PATENT OFFICE

DELBERT L. LOTTS, OF CHICAGO, ILLINOIS, ASSIGNOR, BY DIRECT AND MESNE ASSIGNMENTS, TO GENERAL RESEARCH CORPORATION, OF CHICAGO, ILLINOIS, A CORPORATION OF ILLINOIS

TRANSMISSION

Application filed January 24, 1930. Serial No. 423,030.

This invention relates to an improved simplified type of transmission adapted to be used between a driving shaft and a driven shaft and obviating the use of the customary clutch mechanism and gear shifting ordinarily required in transmitting a drive from a driving shaft to a driven shaft to rotate the driven shaft at different rates of speed.

It is an object of this invention to provide a power transmission device of improved and simplified form adapted for the transmission of variable speeds from a driving shaft to a driven shaft through the medium of intermeshing worm members and adjustable means for changing the relative speed of the worm members with respect to one another to create a planetary gear action between the worm members to cause a drive to be transmitted from a driving shaft to a driven shaft proportionate to the relative difference in speed between the worm members.

It is also an object of this invention to provide an improved type of power transmission between a driving member and a driven member through the medium of intermeshing worm members disposed in a transmission casing connecting the driving member with the driven member and having lever controlled relatively shiftable helical gear control members for varying the speed of the worm members with respect to one another and produce a relative travelling movement of said worm members relative to one another to permit variable speeds to be transmitted to the driven member through the locking action between the worm members.

It is a further object of this invention to provide an improved type of power transmission between a driving member and a driven member by means of worm members rotatably engaging one another at the same rate of speed and adapted to have the relative speed thereof varied by the relative shifting of intermeshing helical gears to permit a variable drive to be transmitted to the driven member.

Still another object of the invention is to provide a transmission for transmitting a variable speed from a driving member to a driven member through worm members one of which is adapted to have the speed thereof varied with respect to the other by means of relatively adjustable intermeshing gears adapted to be adjusted to vary the torque between the worm members to produce relative travel therebetween and a transmission of the drive from the driving to the driven member commensurate with the changes in the rotating speed of the worm members.

It is furthermore an object of this invention to provide an improved transmission wherein a pair of shafts are adapted to be connected by a transmission housing through the medium of worm members rotatably engaging one another and adapted to have the speed of rotation between one another varied through helical gear control mechanism carried by the housing and the driven shaft to be rotated at a rate of speed proportionate to the torque produced between the worm members to permit the speed of the driven member to be increased up to the speed of the driving member when one of the worm members is completely locked with the other and rotates therewith.

It is an important object of this invention to provide an improved simplified type of transmission between a driving member and a driven member through the medium of a housing and worm members therein having relative rotative movement with respect to one another and adapted to have the relative rotative speed therebetween varied through a gear train controlled by the relative shifting movement of a master helical gear with respect to auxiliary helical gears, whereby the driving force transmitted from the driving member to the housing or driven member is directly dependent upon the relative change of rotation between the worm members and the relative rate of travel of one of the worm members with respect to the other.

Other and further objects of this invention will be apparent from the disclosures in the specification and the accompanying drawings.

The invention (in a preferred form) is illustrated in the drawings and hereinafter more fully described.

The reference numeral 1 indicates a driving member or shaft adapted to be connected with a driven member or shaft 2 by means of an improved transmission embodying the principles of this invention. The improved transmission comprises a casing or housing having transmission mechanisms enclosed therein and adapted to be governed by a control mechanism associated with the driven shaft 2 and with the transmission housing as hereinafter more fully described. The transmission housing while indicated and described as of a rectangular configuration may be of a cylindrical type or any other desired selected form. In the present showing the casing or housing comprises a pair of end walls 3 and 4 which are held in separated spaced relation by means of a pair of parallel partition plates or inside walls 5 which are adapted to be rigidly held in position by means of retaining bolts 6 or other suitable means. The partition plates 5 divide the interior of the casing or housing into two side chambers 7 and an intermediate chamber 8. Two pair of side closure plates 9 and 10 are provided to close the chambers 7 and 8 and are adapted to be secured in position by means of retaining screws 11 or other suitable means.

Keyed or otherwise secured on the driving shaft 1 within the main or intermediate chamber 8 and adjacent the inner surface of the housing end wall 3 is a worm gear 12 in the present showing having twelve teeth positioned at an angle of 15° to mesh or function with 15° threads of a pair of worms 13 which are positioned in parallel relation on opposite sides of the worm gear 12. Each of the worms 13 is keyed or otherwise secured on a shaft 14 having reduced bearing shanks or sections 15 which are journaled in the partition plates 5 and have engaged therearound ball thrust bearings 16 which are partly seated in suitable recesses provided in the inner surfaces of the partition walls 5 as clearly illustrated in Figure 4. The ball thrust bearings 16 are so positioned to coact with the ends of the worms 13 to receive the end thrust imparted to the worms.

One of the bearing shanks 15 of the shaft 14 is provided with a reduced shaft extension 17 which projects beyond the outer surface of the respective partition wall or plate 5 and has keyed or otherwise secured thereon a spur gear 18 which is spaced from the partition wall 5 by means of a spacing washer 19. Positioned to the outside of the spur 18 and against the outer end of the stud shaft extension 17 is a retaining washer 20 which is held in position by means of a screw 21 which projects through the retaining washer 20 and is threaded into a threaded recess provided in the end of the shaft extension 17 as clearly illustrated in Figure 4.

Figure 2:
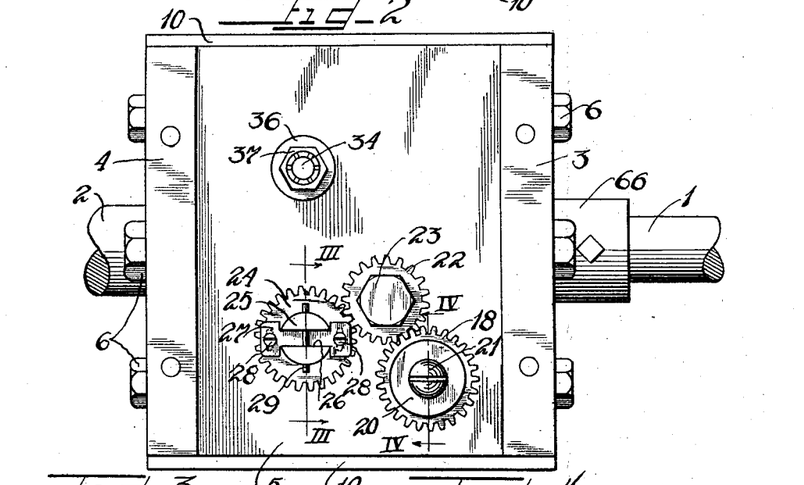
Figure 2 is an enlarged side elevation of the transmission with the side cover plate removed.
Figure 8:
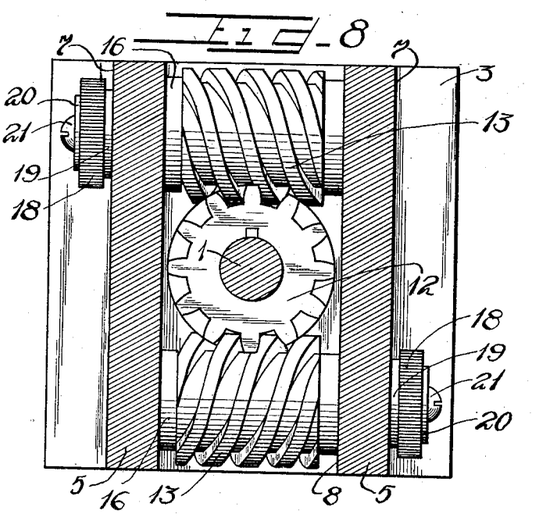
Figure 8 is a transverse detailed sectional view of the transmission taken on line VIII—VIII of Figure 6.

The spur gears 18 are located so that one of the spur gears is positioned to the outside of one of the partition walls 5 while the spur gear 18 for the second worm is positioned to the outside of the second partition wall 5 as clearly illustrated in Figure 8. Each of the worm spur gears 18 has meshing therewith an intermediate spur gear 22 which idles or rotates on a bolt shaft 23 which projects through the intermediate gear 22 and has the inner threaded end thereof engaged in the partition wall 5. Meshing with the intermediate spur gear 22 is a spur gear 24 which completes the chain of spur gears, one set of which is mounted to the outside of each of the partition plates 5 in the arrangement illustrated in Figure 2.

Figures 3, 4:
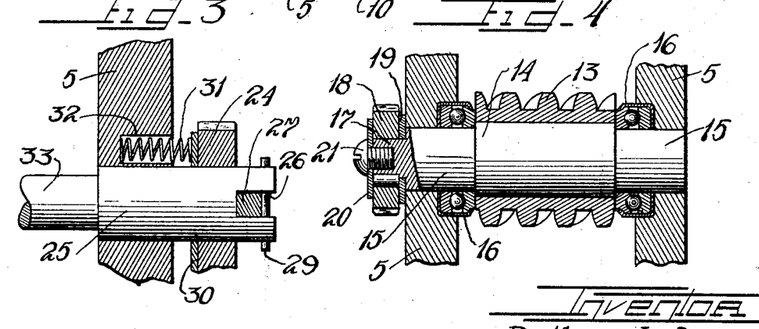
Figure 3 is a fragmentary detailed section taken on line III—III of Figure 2 with parts shown in elevation.
Figure 4 is an enlarged fragmentary detailed section taken on line IV—IV of Figure 2 with parts shown in elevation.

The spur gear 24 is mounted on the outer projecting end of an enlarged shaft bearing section or shank 25 the outer end of which is provided with a diametrical notch or slot 26 in which the shank or body portion of an I-bar or key 27 is seated. The ends or heads of the I-bar 27 are provided with apertures for the reception of screws 28 which engage in screw slots in the spur gear 24. Projecting through a diametric passage or opening in the outer end of the slotted shaft shank 25 is a retaining pin 29 which serves to lock the spur gear 24 on the shaft shank 25. Positioned on the shaft shank 25 adjacent the inner side of the spur gear 24 is a washer ring 30 against which the outer end of a plurality of coiled springs 31 are adapted to seat. The inner ends of the coiled springs 31 seat in pockets or recesses 32 provided in the outer side of the partition plate or wall 5 around the shaft shank 25 as illustrated in Figure 3.

The shaft bearing shank extension 25 is integrally formed on one end of an auxiliary helical gear supporting shaft 33 the opposite end of which is reduced in diameter to provide a shaft bearing shank section 34 which projects through a bearing opening in the opposite partition wall 5 and has the outer end thereof threaded at 35 to receive an internally threaded retaining ring or washer 36 threaded thereon to limit the shifting of the auxiliary shaft 33 inwardly from the threaded end 35 of said shaft. To hold the retaining ring or washer 36 locked in position on the threaded portion 35 of the shaft 33 a lock washer or nut 37 is engaged on the threaded extension 35 of the shaft to the outside of the lock ring or washer 36 as clearly illustrated in Figure 5. Keyed or otherwise secured on the auxiliary shaft 33 between the partition walls 5 is a secondary or auxiliary helical gear 38 the teeth of which are cut at a helix angle of 45°.

Figure 6:
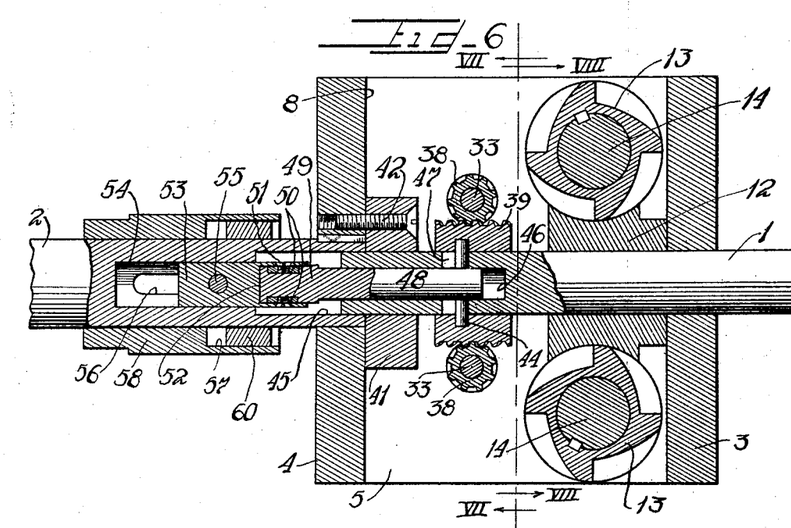
Figure 6 is a longitudinal sectional view of the transmission taken on line VI—VI of Figure 5 with parts shown in elevation.
Figure 7:
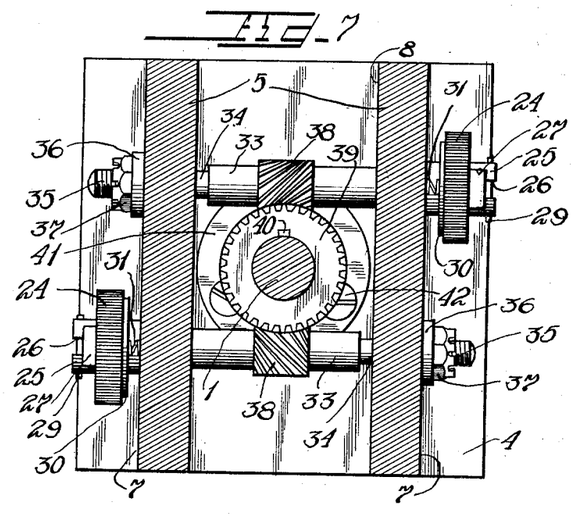
Figure 7 is a detailed sectional view of the transmission taken on line VII—VII of Figure 6.

As illustrated in Figure 7 there are two auxiliary helical gears 38 mounted on the parallel auxiliary shafts 33 disposed on opposite sides and at right angles to the main driving shaft 1. The auxiliary helical gears 38 are in mesh with the 45° angle teeth of a main large helical gear 39 which is slidably keyed by means of a key 40 on the main driving shaft 1 within the housing chamber 8 between the inner end of the worm gear 12 and a bearing block 41 secured on the inner side of the housing end wall 4 by means of retaining screws 42 or other suitable means as clearly illustrated in Figure 6. The main helical gear 39 is adapted to be shifted with respect to the auxiliary helical gears 38 for the purpose of changing the relative speed of rotation between the worms 13 and the worm gear 12 to control the driving torque between the driving shaft 1 and the driven shaft 2. The main helical control gear 39 is provided with a diametrical opening or slot 43 in one end thereof for the purpose of receiving a pin or peg 44 which is adapted to fit in segmental grooves provided within the helical gear 39 so that the pin 44 may be positioned at substantially right angle to the inlet slot 43 to hold the pin locked in engagement with the main helical gear 39 to permit shifting of the same on the main driving shaft 1.

Figure 5:
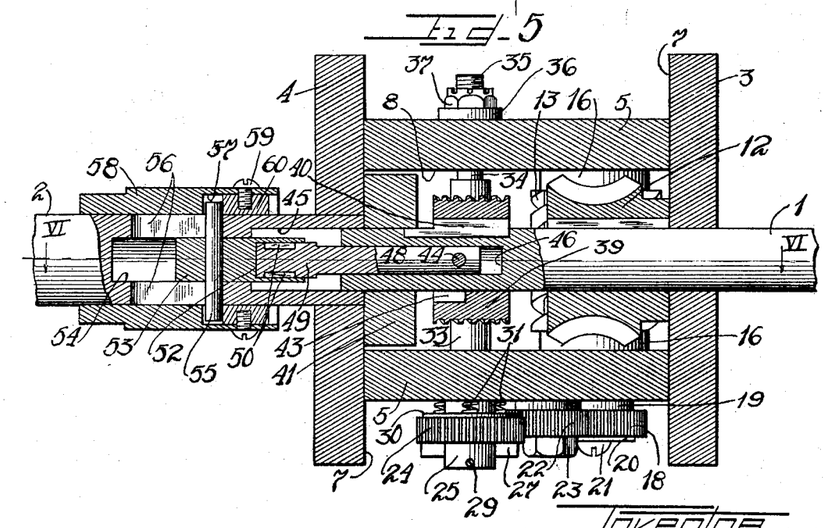
Figure 5 is an enlarged fragmentary longitudinal sectional view of the transmission taken on line V—V of Figure 1 with parts shown in elevation and with the side closure plates of the transmission housing omitted.

The inner end of the main driving shaft 1 projects through the bearing block or member 41 and into an axial chamber or opening 45 provided in the inner end of the driven shaft 2 the end of which extends into an opening provided in the transmission end housing plate 4 as clearly illustrated in Figures 5 and 6. The inner end of the driving shaft 1 is provided with an axial passage or recess 46 through which the pin 44 projects with the projecting portion of the pin passing through a diametric guide slot 47 provided in the driving shaft 1 to afford an arrangement whereby the main helical gear 39 may be shifted longitudinally on the driving shaft 1 by means of a plunger or rod 48 which slidably projects axially into the passage 46 provided in the end of the driving shaft 1. The pin 44 projects through a diametric passage provided in the inner end of the plunger rod 48 as clearly illustrated in Figures 5 and 6. The plunger rod 48 projects out of the end of the driving shaft 1 into the driven shaft recess or chamber 45 and has an enlarged head 49 integrally formed thereon. The plunger head 49 is provided with a peripheral groove in which a pair of ring sections or arcuate segments 50 are slidably seated to permit the same to rotate in the groove of the plunger head. The ring sections or curved segments 50 are secured by retaining screws 51 or other suitable means circumferentially within a recess 52 provided in one end of a shift core or slide member 53 which is slidably engaged in an axial chamber or passage 54 provided in the driven shaft 2 to the inside of the axial chamber or opening 45. Engaged diametrically through an opening in the shift core 53 is a control pin or bar 55 the ends of which project through a pair of diametrically opposite slots 56 provided in the inner end of the driven shaft 2. The ends of the control pin 55 which project through the slots 56 of the driven shaft project into a chamber or recess 57 provided in one end of a shiftable sleeve or collar 58 which is slidably engaged on the end section of the driven shaft 2 as clearly illustrated in Figures 5 and 6. Engaged in the outer end of the shiftable sleeve or collar 58 by means of screws 59 or other suitable devices is a retaining ring or collar 60.

To facilitate shifting of the shifter collar or sleeve 58 on the driven shaft 2, said shift collar has pivotally connected to opposite sides thereof a pair of connecting rods or links 61, the outer ends of which are pivotally connected to opposite sides of a yoke or fork 62 having integrally formed thereon an arm or lever 63 to facilitate operation of the fork. The fork 62 is pivoted on pivot pins 64 mounted diametrically opposite one another on a collar or sleeve 65 engaged on the driven shaft 2 to the outside of the shift collar or sleeve 58 as clearly illustrated in Figure 1.

The lever supporting collar or sleeve 65 has the driven shaft 2 journalled therein and is adapted to be rigidly held in position by any suitable means when the improved transmission is coupled up for use between a driving shaft 1 and a driven shaft 2 on one end of which a transmission housing is adapted to be rigidly secured by suitable clamping or retaining means. Secured on the driving shaft 1 to the outside of the transmission housing end plate 3 is a retaining or stop collar 66 for properly holding the transmission housing and the driving and driven shafts in proper coacting relation.

The operation is as follows:

The improved transmission is adapted to be used for transmitting a drive from a driving member to a driven member without the use of the customary clutch mechanism and without requiring the shifting of gears for driving the driven member from the driving member at variable speeds. The improved transmission may be used as a transmission for power in motor vehicles, in machine shops or in any desired position or combination wherein it is necessary to transmit a driving power from a driving member or shaft to a driven member or shaft.

As illustrated in Figure 6 the transmission housing is rigidly keyed to the driven shaft 2 on which the control mechanism is mounted for governing the operation of the meshing helical control gears 38 and 39, the relatively adjustment of which regulates the speed of rotation of the worms 13 relative to the rotative speed of the worm gear 12, which is keyed to and rotates with the driving shaft or member 1. The transmission embraces the housing or casing which is connected between the driving and driven shafts and encloses the worm gear 12 on the driving shaft 1 and the co-acting intermeshing worms 13 which are rotatably mounted in the housing and are controlled by means of the adjustment of the main helical gear 39 with respect to the auxiliary helical gears 38 which are mounted on the rotatable and shiftable auxiliary shafts 33. The shafts 33 are connected with the worm by the two sets of spur gears the speed of which govern the rotation of the worms 13 relative to the speed of rotation of the worm gear 12 to vary the torque between the worms and the worm gear to determine the rate of travel of the worms around the worm gear to permit any degree of speed to be imparted from the driving shaft 1 to the driven shaft 2 from a stationary or stopped position of said shaft 2 to a rate of speed equal to the speed of the driving shaft 1 depending upon the adjustment of the control lever 63 which governs the relative position of the main helical control gear 39 with respect to the auxiliary helical gears 38.

Figure 1:
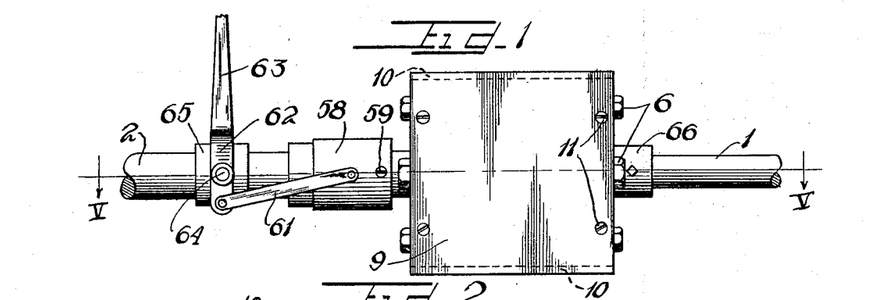
Figure 1 is a side elevation of an improved transmission embodying the principles of this invention.

When the control lever 63 is in a neutral position similar to that illustrated in Figure 1 the main control helical gear 39 is so positioned with respect to the auxiliary gears 38 that the spur gear trains permit the worms 13 to rotate at the same rate of rotational speed as the worm gear 12 and the driving shaft 1 so that there is no relative travel of the worms around the worm gear, consequently causing no drive from the driving shaft 1 to be transmitted to the transmission housing and the driven shaft 2 connected therewith. It will thus be seen that when the control lever is in neutral position that the transmission housing remains stationary as does also the driven shaft 2.

When it is desired to cause a drive to be transmitted to the driven shaft 2 the control lever 63 is moved inwardly toward the transmission housing thereby causing the lower end of the fork 62 to swing outwardly causing the connecting links 61 to act upon the control sleeve or collar 58 to shift the same outwardly on the driven shaft 2 away from the transmission housing. The pull exerted on the connecting links 61 causes the collar 58 to slide outwardly on the driven shaft 2 thereby causing the pin 55 to slide in the grooves 56 of the driven shaft permitting the connecting rod section 53 to slide in the shaft recess 54 and cause a pull to be exerted on the connecting shaft section 48 to cause the same to slide outwardly with respect to the driven shaft 2 whereby the pin 44 in the connecting shaft section 48 slides outwardly with respect to the driving shaft 1 thereby causing the main control helical gear 39 to be shifted or slidably moved outwardly on the driving shaft 1 in a direction approaching the end of the driven shaft 2 so that the relative position of the main helical gear 39 with respect to the auxiliary helical gears 38 is changed. The shifting of the main helical gear 39 with respect to the auxiliary helical gears 38 varies the driving torque between said helical gears and causes the auxiliary helical gears and the shafts 33 supporting the same to be rotated at a reduced rate of speed so that the speed transmitted to the spur gear trains is proportionately reduced, consequently causing the speed of rotation of the worms 13 to be also proportionately reduced so that the worms rotate at a slower rate of speed than the speed of rotation of the worm gear 12. This change in the relative speed of rotation of the worms with respect to the worm gear 12 produces a torque between the meshing worms and the worm gear thereby causing the worms during their rotation to travel circumferentially around the worm gear 12 at a rate of speed depending upon the relative adjustment of the main helical gear 39 with respect to the auxiliary helical gears 38. Any end thrusts which may be produced due to the travel of the worms around the worm gear is compensated for by the ball thrust bearings 16. Any end thrusts which are transmitted to the auxiliary shafts 33 on which the auxiliary helical gears 38 are mounted is compensated for by the springs 31 which are associated with the spur gears 24 so that there will be no difference in the relative drives transmitted from one of the shafts 33 to its corresponding worm 13 from that transmitted by the other auxiliary shaft 33 to the other worm 13. An arrangement has thus been provided whereby the drive transmitted to both of the worms 13 is always substantially the same, thereby producing a balanced drive connection of the two worms 13 with respect to the worm gear 12.

Any unevenness in the co-acting relation of the two worms 13 with the worm gear 12 may also be compensated for by the adjustment of the I-bars 27 with respect to the spur gears 24. It will thus be noted that two arrangements are provided whereby the adjustment of the worms with respect to the worm gear may be taken care of so that said worms 13 on opposite sides of the worm gear 12 may have an equalized co-acting relation with the worm gear to produce a properly balanced transmission mechanism consisting of a properly balanced or adjustable gear and worm group unit which co-operates with the worm gear on the driving shaft.

The outward movement of the master helical gear 39 outwardly at right angles with respect to the helical gears 38 causes a corresponding reduction in the speed of rotation of the worms 13 with respect to the worm gear 12 so that with the reduction in the speed of rotation of the worms 13 the rate of travel of said worms 13 around the worm gear 12 is proportionately increased as is also the speed of rotation of the transmission housing and the driven shaft 2 connected therewith. The speed of rotation of the worms 13 is adapted to be decreased until the rate of travel of the worms around the worm gear 12 becomes equal to the speed of rotation of the driving shaft 1 and the worm gear 12 producing a condition wherein the worms 13 are locked with the worm gear 12 simultaneously causing a locking of the spur gears and the helical gears, thereby producing a condition of high speed transmission wherein the speed of rotation of the driving shaft 1 is transmitted directly to the locked transmission and to the driven shaft 2.

It will thus be seen that the improved transmission permits a variable speed to be transmitted from the driving shaft 1 to the driven shaft 2 depending directly upon the adjustment of the main helical gear 39 with respect to the auxiliary helical gears 38 by the shifting of the control sleeve or collar 58 through the medium of the links 61 operable by the control lever 63 and the control fork 62 which is pivotally mounted on the stationary supporting collar 65 on which the control lever is mounted.

While a rectangular housing is illustrated and described in connection with the gear and worm mechanism of the transmission it will, of course, be understood that a cylindrical housing or any other design of transmission housing may be used.

Attention is also called to the fact that the lever control mechanisms illustrated and described in connection with Figures 1, 5 and 6 of the drawings may, of course, be varied in construction to suit the particular adaptation to which the improved transmission is put.

It will, of course, be understood that various other details of construction may be varied through a wide range without departing from the principles of this invention and it is therefore not the purpose to limit the patent granted hereon otherwise than necessitated by the scope of the appended claims.

I claim as my invention:

1. A transmission comprising a driving shaft, a driven shaft, a housing secured to said driven shaft and having the driving shaft journalled therein, a worm gear in said housing secured to said driving shaft, a worm rotatably supported in said housing and meshing with said worm gear, a main helical gear slidably mounted on said driving shaft, an auxiliary helical gear meshing therewith, means connecting the same with said form, and a control for shifting said main helical gear with respect to said auxiliary helical gear for varying the speed of rotation of the worm with respect to the speed of rotation of the worm gear to permit a variable speed to be transmitted from the driving shaft to said driven shaft.

2. A power transmission comprising a driving shaft, a driven shaft, a housing secured to said driven shaft and having one end of the driving shaft journalled therein, a worm mechanism in said housing and connected with said driving shaft, and relatively adjustable helical gear members for governing the operation of the worm mechanism to permit a drive to be transmitted from the driving shaft to said housing and said driven shaft.

3. A power transmission comprising a driving shaft, a driven shaft axially aligned therewith, a housing supported on said driven shaft and enclosing one end of said driving shaft, a worm gear secured on said driving shaft within said housing, a worm rotatably mounted in said housing and meshing with said worm gear, a helical gear slidably keyed on said driving shaft within said housing, an auxiliary helical gear co-acting therewith, means connecting said auxiliary helical gear with said worm, and a control mechanism associated with the driven shaft and connected with said main helical gear to permit the same to be adjusted with respect to the auxiliary helical gear to vary the speed of rotation of the worm with respect to the worm gear and permit a variable drive to be transmitted from the driving shaft to said driven shaft.

4. A power transmission comprising a driving member, a driven member, a worm gear secured on the driving member, a rotatable worm meshing with said worm gear and mounted to permit the same to travel circumferentially around the worm gear, and helical gears mounted to permit one to be shifted with respect to the other for governing the speed of rotation of the worm relative to the rotation of the worm gear to permit a variable speed to be transmitted from the driving member to the driven member.

5. A power transmission comprising a driving member and a driven member, a housing connecting the same, a worm gear secured on the driving member to rotate therewith, a worm rotatably supported in said housing and having rotatable meshing engagement with said worm gear, and helical gear control means comprising a gear connected to said driving member to rotate therewith and axially movable relative thereto for changing the speed of rotation of the worm with respect to the worm gear to permit a variable speed to be transmitted from the driving member to the driven member.

6. A power transmission comprising axially aligned driving and driven members, a housing secured to said driven member, a worm gear secured on the driving member within said housing, a worm rotatably supported in said housing having rotatable interfitting engagement with said worm gear, a main control helical gear shiftably keyed on said driving member within said housing, an auxiliary helical gear meshing with said main helical gear, a gear train connecting said auxiliary helical gear with said worm, and control means connected with the driven member and with the main helical gear on said driving member to permit the main helical gear to be shifted with respect to the auxiliary helical gear to vary the speed of rotation of the worm with respect to the worm gear to permit a variable drive to be transmitted from the driving member to said housing and the driven member.

7. A transmission comprising a driving mechanism, a driven mechanism, a worm gear secured on the driving mechanism, a worm rotatably supported by said driven mechanism and having rotatable meshing engagement with the worm gear, and a control mechanism including helical gears intermeshing at right angles with respect to one another and connected with the worm for varying the relative speed of rotation thereof with respect to the worm gear to cause a relative circumferential travel of the worm around the worm gear and the transmission of a variable speed from the driving mechanism to said driven mechanism.

8. A power transmission comprising a driving member, a driven member, a housing supported on said driven member and enclosing one end of said driving member, a worm gear secured on said driving member within said housing, a worm rotatably supported in said housing and having rotatable meshing engagement with said worm gear, a gear train connected with said worm and supported in said housing, an auxiliary shaft journalled in said housing and connected with said gear train, an auxiliary helical gear secured on said auxiliary shaft, a main helical gear shiftably keyed on said driving member within said housing and having meshing engagement with said auxiliary helical gear, and a control mechanism connected with said main helical gear and operable from the exterior of said housing to cause the main helical gear to be shifted with respect to the auxiliary helical gear to vary the speed of rotation of the worm with respect to the worm gear to cause a drive from the driving member to be transmitted to the driven member at a speed proportional to the relative change in rotational speed between the worm and said worm gear.

9. A power transmission comprising a driving member, a driven member, a housing secured to said driven member and journalled on said driving member, a worm gear secured on said driving member within said housing, a plurality of worms rotatably mounted in said housing and having rotatable meshing engagement with said worm gear, a plurality of auxiliary shafts journalled in said housing, an auxiliary helical gear secured on each of said auxiliary shafts, a train of intermeshing spur gears between each auxiliary shaft and one of said worms, a main helical gear slidably keyed on said driving member within said housing having meshing engagement with said auxiliary helical gears, a control sleeve shiftably mounted on the driven member to the outside of said housing, means connecting said control sleeve with said main helical gear, and a control device connected with said control sleeve to permit operation thereof and shifting of the main helical gear with respect to the auxiliary helical gears to cause the relative speed of rotation of the worms with respect to the worm gear to be changed to permit a variable speed to be transmitted from the driving member to said driven member.

10. A power transmission comprising a driving member, a driven member axially engaged with one end thereof, a housing rigidly secured to said driven member and journalled on said driving member, a worm gear in said housing secured on said driving member, a plurality of worms rotatably journalled in said housing and having rotatable meshing engagement with said worm gear, a main helical gear shiftably keyed on said driving member within said housing, a plurality of auxiliary helical gears meshing with said main helical gear, auxiliary shafts journalled in said housing and supporting said auxiliary helical gears, trains of intermeshing spur gears connecting said auxiliary shafts with said worms, a control mechanism connecting said driven member with said main helical gear to permit shifting of the main helical gear with respect to the auxiliary helical gears to vary the speed of rotation of said worms with respect to said worm gear to cause a variable speed to be transmitted from said driving member to said driven member, and mechanisms connected with said auxiliary shafts adapted to maintain the worms in equalized working relation with the worm gear.

11. A power transmission comprising a pair of rotatably interfitting shafts, a housing secured on one of said shafts and journalled on the other of said shafts, a worm gear secured on one of said shafts within said housing, worms rotatably mounted in said housing and having rotatable intermeshing engagement with said worm gear, a main helical gear shiftably keyed on the shaft on which said worm gear is secured, a plurality of auxiliary helical gears meshing with said main helical gear, gear trains connecting said auxiliary helical gears with said worms, a control mechanism connected with said main helical gear to permit the same to be shifted with respect to said auxiliary helical gears to cause the speed of rotation of the worms to be varied with respect to the speed of rotation of the worm gear to permit a variable speed to be transmitted from one of said shafts to the other, and means connected with said gear trains for maintaining the worms in equalized co-acting engagement with said worm gear.

12. A power transmission comprising a driving shaft and a driven shaft, a housing secured on said driven shaft, a worm gear secured on said driving shaft within said housing, a worm journalled in said housing and meshing with said worm gear, gear mechanisms connecting said driving shaft with said worm, and a control mechanism for shifting one of said gear mechanisms at right angles with respect to the others to cause the speed of rotation of the worm with respect to the worm gear to be varied to cause a variable speed to be transmitted from the driving shaft to the driven shaft.

13. A power transmission comprising a driving member, a driven member, a worm gear secured on the driving member, a worm connected with the driven member and co-acting with said worm gear, and helical control members connected with the worm and shiftable one with respect to the other for varying the speed of rotation of the worm with respect to said worm gear to govern the relative travel of said worm around said worm gear to permit a gradual increasing or decreasing rotational drive to be transmitted from the driving member to said driven member.

14. A power transmission comprising a driving member, a driven member, a housing secured on said driven member and journalled around said driving member, a worm gear secured on said driving member within said housing, a worm rotatably journalled in said housing and having rotatable meshing engagement with said worm gear, thrust ball bearings for said worm, intermeshing spur gears connected with said worm, an auxiliary shaft shiftably journalled in said housing and supporting one of said spur gears, means connected with the spur gear on said auxiliary shaft to maintain the worm in proper co-acting relation with the worm gear, an auxiliary helical gear mounted on said auxiliary shaft, a main helical gear meshing with said auxiliary helical gear, said main helical gear having shiftable keyed engagement with said driving member, and a control lever mechanism associated with the driven member to the outside of said housing and connected with said main helical gear to vary the driving torque between said main helical gear and said auxiliary helical gear to cause the speed of rotation of the worm with respect to the worm gear to be proportionately varied to permit a gradual variable speed to be transmitted from the driving member to the driven member.

15. A power transmission comprising a driving member, a driven member, a worm gear secured on the driving member, a worm journalled in the driven member and rotatably meshing with said worm gear, means connected with said driving member to cause rotation of the worm, and a helical gear control device for adjusting said means to vary the speed of rotation of the worm with respect to the worm gear to cause a variable speed to be transmitted from the driving member to the driven member proportionate to the relative change in the speed of rotation of the worm with respect to the rotation of the worm gear.

16. A power transmission comprising a driving member, a driven member, a housing rigidly secured on said driven member and journalled on said driving member, a 15° worm gear secured on said driving member, a 15° worm rotatably meshing with said worm gear, a 45° helical gear slidably keyed on said driving member, a 45° auxiliary helical gear meshing with said main helical gear, a gear train connecting said auxiliary helical gear with said worm, and means for adjusting the main helical gear shiftably at right angles with respect to said auxiliary helical gear to vary the speed of rotation of the worm with respect to the speed of rotation of said worm gear to permit a variable drive to be transmitted from the driving member to said driven member.

17. A power transmission comprising a driving member, a driven member, meshing worm members one of which is driven by the driving member, gear members connecting the driven member with said worm members for varying the speed of rotation of one worm member with respect to the other to cause a variable drive to be transmitted from the driving member to the driven member, and a control device connected with one of said gear members to shift the same with respect to the remaining gear members to produce the variable drive.

18. A transmission comprising a driving mechanism and a driven mechanism, means including a worm and gear connecting said mechanisms, and relatively shiftable interfitting gears connected with said means and shiftable with respect to one another for changing the relative speed of rotation between the worm and gear members forming said means to cause a gradually changing variable speed to be transmitted from the driving mechanism to said driven mechanism.

19. A power transmission comprising a driving member, a driven member, meshing worm members for effecting a drive between said members, a gear train including intermeshing worm gear members between said driving member and said worm members, and control means for shifting said worm gear members relatively to one another for changing the relative speed of said worm members to cause a gradually changing variable speed to be transmitted from the driving member to the driven member.

In testimony whereof I have hereunto subscribed my name at Chicago, Cook County, Illinois.

DELBERT L. LOTTS.